(12) United States Patent
Miyagi

(10) Patent No.: US 7,876,961 B2
(45) Date of Patent: Jan. 25, 2011

(54) METHOD AND APPARATUS FOR PROCESSING IMAGE, AND COMPUTER PROGRAM PRODUCT

(75) Inventor: Noriko Miyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 999 days.

(21) Appl. No.: 11/713,246

(22) Filed: Mar. 1, 2007

(65) Prior Publication Data

US 2007/0206228 A1    Sep. 6, 2007

(30) Foreign Application Priority Data

Mar. 1, 2006    (JP)    ............................ 2006-055051

(51) Int. Cl.
*G06K 9/46* (2006.01)
*G06T 7/00* (2006.01)
*G06T 5/00* (2006.01)

(52) U.S. Cl. ................ 382/190; 382/199; 382/254; 382/274; 358/2.1

(58) Field of Classification Search ............. 382/173, 382/181, 199, 254, 274, 190; 358/1.9, 2.1
See application file for complete search history.

(56) References Cited

U.S. PATENT DOCUMENTS 7,286,717 B2 * 10/2007 Nomizu .................. 382/280

| | | |
|---|---|---|
| 2003/0058465 A1 | 3/2003 | Miyagi et al. |
| 2003/0095287 A1 | 5/2003 | Miyagi et al. |
| 2004/0114815 A1 | 6/2004 | Shibaki et al. |
| 2004/0165081 A1 | 8/2004 | Shibaki et al. |
| 2004/0165747 A1 | 8/2004 | Shibaki et al. |
| 2004/0252316 A1 | 12/2004 | Miyagi et al. |
| 2004/0257622 A1 | 12/2004 | Shibaki et al. |
| 2005/0018258 A1 | 1/2005 | Miyagi et al. |
| 2005/0018903 A1 | 1/2005 | Miyagi et al. |
| 2005/0207661 A1 | 9/2005 | Miyagi et al. |
| 2006/0187246 A1 | 8/2006 | Miyagi et al. |
| 2006/0256123 A1 | 11/2006 | Miyagi et al. |
| 2006/0274332 A1 | 12/2006 | Miyagi et al. |

FOREIGN PATENT DOCUMENTS

| JP | 2000-134471 | 5/2000 |
|---|---|---|
| JP | 2003-189090 | 7/2003 |

* cited by examiner

*Primary Examiner*—Jon Chang
(74) *Attorney, Agent, or Firm*—Blakely, Sokoloff, Taylor & Zafman LLP

(57) ABSTRACT

A character-edge detecting unit detects a character edge area in an image. A character-inside-area detecting unit detects a character inside area in the image. A density-information detecting unit detects density information in the image. An image processing unit executes a predetermined image processing according to results of detecting the character edge area, the character inside area, and the density information. The image processing unit applies different image processings or different image processing parameters to the character inside area based on the density information.

19 Claims, 23 Drawing Sheets

● BLACK PIXEL
OTHERS: DON'T CARE
A TARGET PIXEL IS LOCATED
AT THE CENTER

○ WHITE PIXEL
OTHERS: DON'T CARE
A TARGET PIXEL IS LOCATED
AT THE CENTER

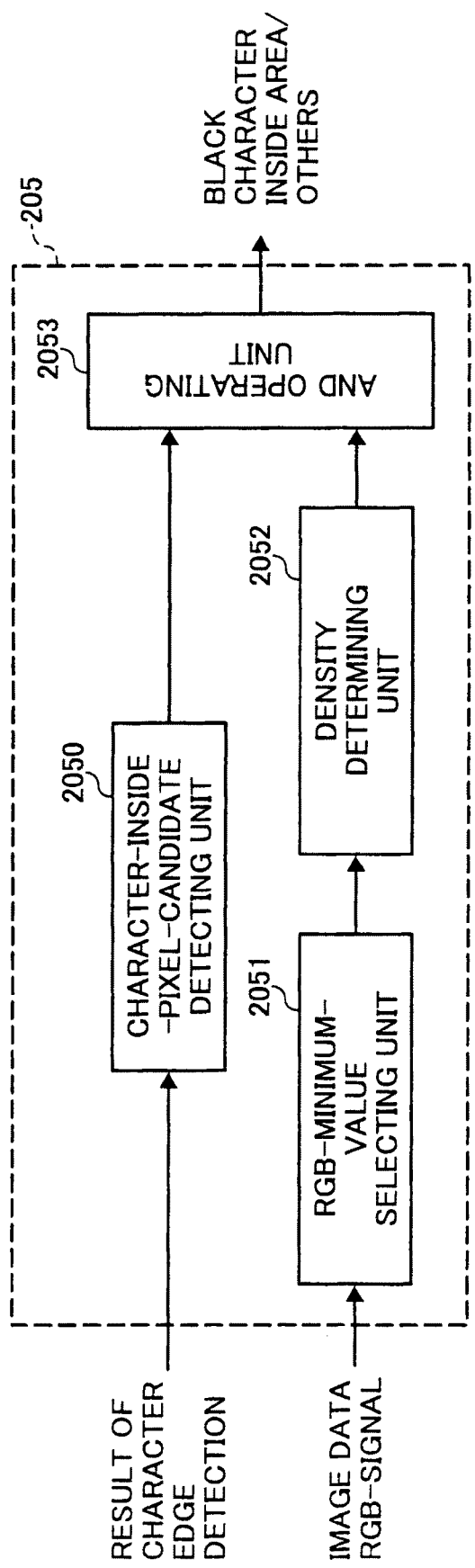

| | 1. BLACK CHARACTER EDGE | 2. LOW-DENSITY BLACK-CHARACTER INSIDE AREA |
|---|---|---|
| FILTER | EDGE-AMOUNT LUT FOR CHARACTER | |
| PRINTER COLOR CORRECTION | COLOR CORRECTION PARAMETER FOR CHARACTERS | |
| INK PROCESSING | INK GENERATION TABLE FOR CHARACTERS & UCR ADJUSTMENT PARAMETER | |
| PRINTER γ | γ-TABLE FOR CHARACTERS | |
| INTERMEDIATE TONE | DITHER FOR CHARACTERS | |

FIG. 10AB

| 3. HIGH-DENSITY BLACK-CHARACTER INSIDE AREA | 4. COLOR CHARACTER EDGE | 5. HALFTONE DOT | 6. OTHERS |
|---|---|---|---|
| | | EDGE-AMOUNT LUT FOR HALFTONE DOT | EDGE-AMOUNT LUT FOR CONTINUOUS TONE |
| COLOR-CORRECTION PARAMETER FOR PICTURES | | | |
| INK GENERATION TABLE FOR PICTURES & UCR ADJUSTMENT PARAMETER | | | |
| γ-TABLE FOR PICTURES | γ-TABLE FOR CHARACTERS | γ-TABLE FOR PICTURES | |
| DITHER FOR PICTURES | DITHER FOR CHARACTERS | DITHER FOR PICTURES | |

FIG. 10BB

| 3. HIGH-DENSITY BLACK-CHARACTER INSIDE AREA | 4. COLOR CHARACTER EDGE | 5. HALFTONE DOT | | 6. OTHERS | |
|---|---|---|---|---|---|
| | | EDGE-AMOUNT LUT FOR HALFTONE DOT | | EDGE-AMOUNT LUT FOR CONTINUOUS TONE | |
| COLOR-CORRECTION PARAMETER FOR PICTURES | | | | | |
| INK GENERATION TABLE FOR PICTURES & UCR ADJUSTMENT PARAMETER | | | | | |
| | | | | γ-TABLE FOR PICTURES | |
| | | | | DITHER FOR PICTURES | |

FIG. 12B

METHOD AND APPARATUS FOR PROCESSING IMAGE, AND COMPUTER PROGRAM PRODUCT

PRIORITY

The present application claims priority to and incorporates by reference the entire contents of Japanese priority document, 2006-055051, filed in Japan on Mar. 1, 2006.

BACKGROUND OF THE INVENTION

1. Field of the Invention

The present invention relates to a technology for performing image processing on image data by determining a character area and a picture area of the image data.

2. Description of the Related Art

In most image processing devices that identify character areas and picture areas and apply different image processing to the character or the picture areas discretely, an area that is identified as a character area and is subjected to image processing for characters is, in most cases, a character edge area. When the line width is up to about 10 dots, it is not difficult to determine that the area including the inside is a character area. When the line width is larger, it is difficult to determine that the area including the inside is a character area. In this case, image processing for characters is applied to the edge area and image processing for pictures is applied to the inside area, the differences in color and brightness between the two areas becomes visually identifiable, which degrades the picture quality.

In the devices described in Japanese Patent Application Laid-Open Publication Nos. 2000-134471 and 2003-189090, to minimize the differences between the processing applied to a character inside area and that applied to a character edge area for the purpose to make the visual degradation less remarkable, a character edge area, a character inside area, and a picture area are distinguished from each other, and proper image processing such as the ink process and the γ conversion process is applied to the identified areas respectively. For the character inside area, image processing is applied using image processing parameters having substantially intermediate characteristics between the characteristics of image processing parameters for character edges and the characteristics of image processing parameters for pictures. In Japanese Patent Application Laid-Open Publication No. 2003-189090, exactly the same parameters as the parameters for character edge are used in the inking process.

Conventionally, a K simple color inking process for reproduction only with a black color material is applied to an edge of a black character. This scheme is employed to prevent coloring at an edge section due to occurrence of a color shift between a black color material and other color materials when output from a printer. In Japanese Patent Application Laid-Open Publication Nos. 2000-134471 and 2003-189090 as described above, as shown in FIG. 18, K simple color process or inking process close to the K simple color process is applied to inside of a black character.

When an inside area of a high density black character is reproduced using the K simple color process or a process close to the K simple color process, density of the character inside area in the script is not reproduced as it is and is apt to be reproduced slightly brighter, which is disadvantageous. It is generally known that reproduction by adding CMY color materials to a K simple color is more effective than reproduction by using a K simple color for using a lower brightness range of black effectively. Reproduction using not only K but also CMY is performed when a more realistic image is desirable in printing an image, for instance, on photographic paper. What is described above is also applicable to black characters, and the inking process is closely related to an image depth.

Basically, the problem due to the differences in colors and brightness between a character edge area and a character inside area occurs in bold characters having low to medium density. When a black-character edge area is reproduced using a K simple color (a process for a character) and a black character inside area is reproduced using both K and CMY colors (a process for a picture), the result is as shown in the left side of FIG. 19, and inside of the character is reproduced with C, M, and Y color materials and the K color material is not used although all of the K and C, M, and Y color materials should be used. In this case, it becomes difficult to conform colors and brightness in the edge area to those in the character inside area, and it is almost impossible when considering the changes over time. On the other hand, the higher the density in the character inside area is, a larger amount of the K color material is used in the character inside area like in the character edge area, which makes it more difficult to follow the changes. Besides such problems relating to colors and brightness as described above, a white spot may occur in a bold character having low density due to color shift when output, as shown in the right side in FIG. 19. In a bold character having medium density, degradation becomes larger because of a portion having low density although the color is not completely white. In a case of a bold character having high density, however, degradation is smaller even when a color shift occurs. Namely, when processing for a picture is applied to a character inside area alone, troubles of color, brightness, and a white spot occur only in a bold character having low and medium density, and the troubles do not occur in a bold character having high density. On the other hand, when processing for characters is applied, there is the risk that a portion of a picture is wrongly detected as a character inside area to cause serious degradation.

SUMMARY OF THE INVENTION

A method and apparatus for processing image, and computer program product are described. In one embodiment, an image processing device comprises a character-edge detecting unit that detects a character-edge area in an image; a character-inside-area detecting unit that detects a character inside area in the image; a density-information detecting unit that detects density information in the image; and an image processing unit that executes a predetermined image processing according to results of detecting the character edge area, the character inside area, and the density information, wherein the image processing unit applies different image processings or different image processing parameters to the character inside area based on the density information.

BRIEF DESCRIPTION OF THE DRAWINGS

FIGS. 8A and 8B are views illustrating character inside area detection;

FIGS. 10A and 10B illustrate examples of an image processing or image processing parameters according to attributes of images;

FIGS. 12A and 12B are a view and a table for calculation of an edge amount respectively;

DETAILED DESCRIPTION OF THE PREFERRED EMBODIMENTS

An image processing device according to one embodiment of the present invention comprises a character-edge detecting unit that detects a character edge area in an image; a character-inside-area detecting unit that detects a character inside area in the image; a density-information detecting unit that detects density information in the image; and an image processing unit that executes a predetermined image processing according to results of detecting the character edge area, the character inside area, and the density information. The image processing unit applies different image processings or different image processing parameters to the character inside area based on the density information.

An image processing method according to another embodiment of the present invention comprises detecting a character edge area in an image; detecting a character inside area in the image; detecting density information in the image; and executing a predetermined image processing according to results of detecting the character edge area, the character inside area, and the density information. The executing includes applying different image processings or different image processing parameters to the character inside area based on the density information.

A computer program product according to still another embodiment of the present invention comprises a computer-usable medium having computer-readable program codes embodied in the medium that when executed cause a computer to perform a method that comprises: detecting a character edge area in an image; detecting a character inside area in the image; detecting density information in the image; and executing a predetermined image processing according to results of detecting the character edge area, the character inside area, and the density information. The executing includes applying different image processings or different image processing parameters to the character inside area based on the density information.

The above and other embodiments, features, advantages and technical and industrial significance of this invention will be better understood by reading the following detailed description of presently preferred embodiments of the invention, when considered in connection with the accompanying drawings.

Exemplary embodiments of the present invention will be explained in detail below with reference to the accompanying drawings.

Figure 1:
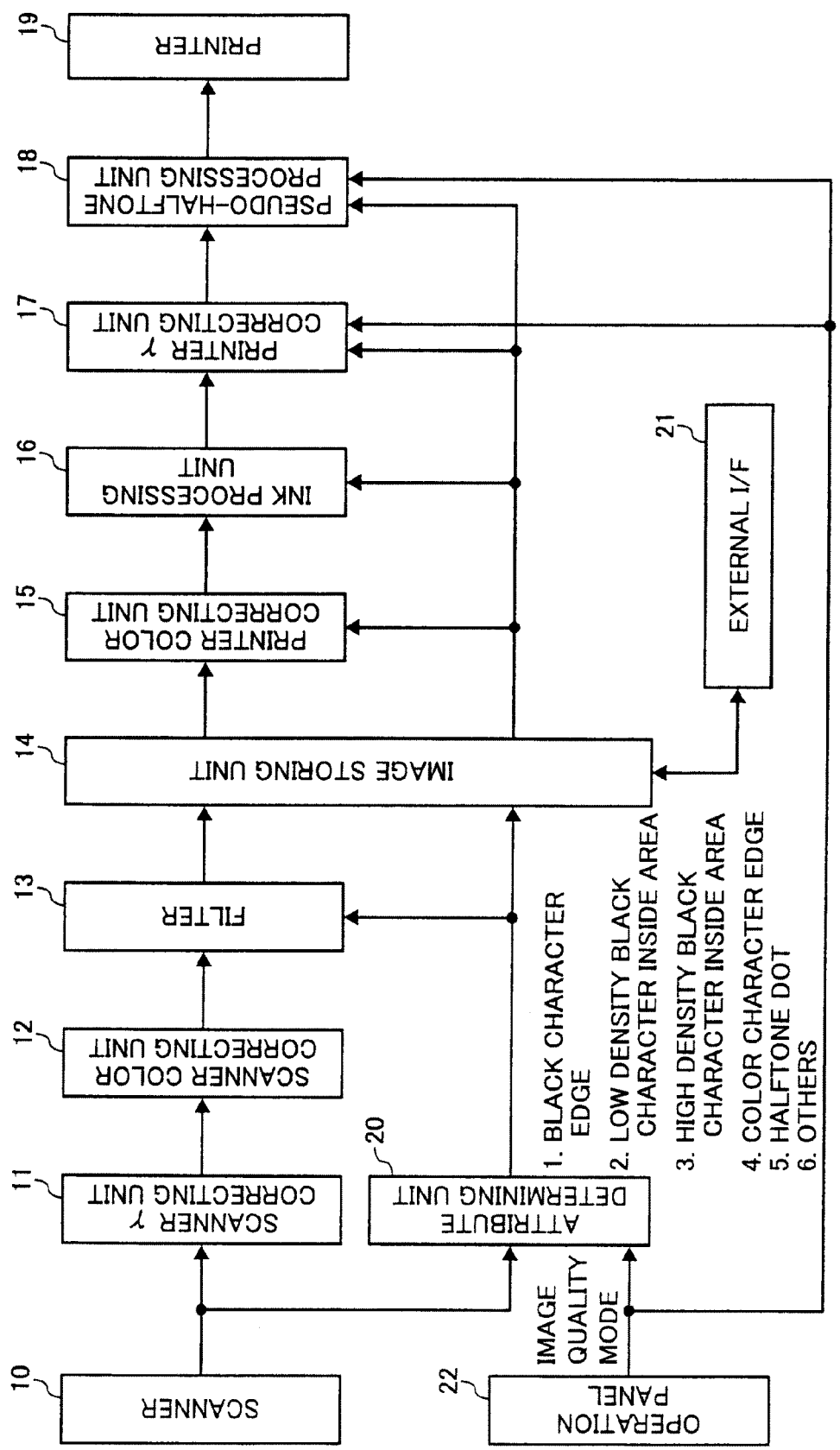
FIG. 1 is a view illustrating a configuration according to a first embodiment of the present invention.

FIG. 1 illustrates a configuration in a first embodiment of the present invention. A scanner 10 acquires image data including RGB signals. A scanner γ correcting unit 11 corrects γ characteristics of the scanner to convert a reflectance-linear signal to a density-linear signal. A scanner color correcting unit 12 converts RGB signals that are dependent on the characteristics of a scanner into R'G'B' signals that are independent of the characteristics of the scanner. On the other hand, an attribute determining unit 20 determines, by using input data from the scanner, in which of the following is included: a (1) black-character edge, (2) low density black character inside, (3) high density black character inside, (4) color-character edge, (5) halftone dot, or (6) other area a target pixel. (Circled numbers 1 through 6 in the figures correspond to above (1) through (6) respectively in this document.) An operation panel 22 allows a user to select and set an image quality mode. The attribute determining unit 20 can switch a parameter according to the image quality mode.

Figure 2:
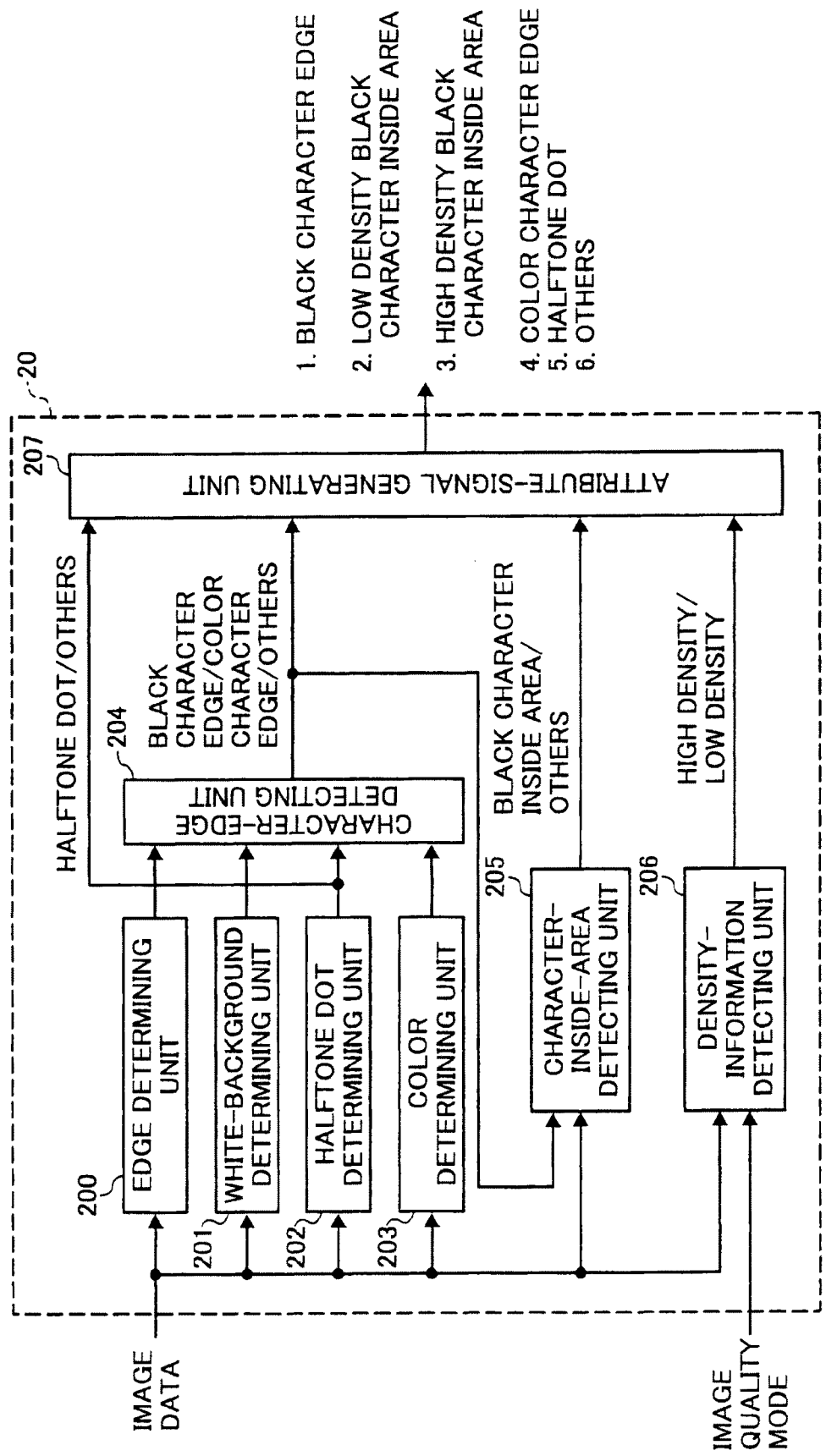
FIG. 2 is a view illustrating a configuration of an attribution determining unit.
Figure 3A:
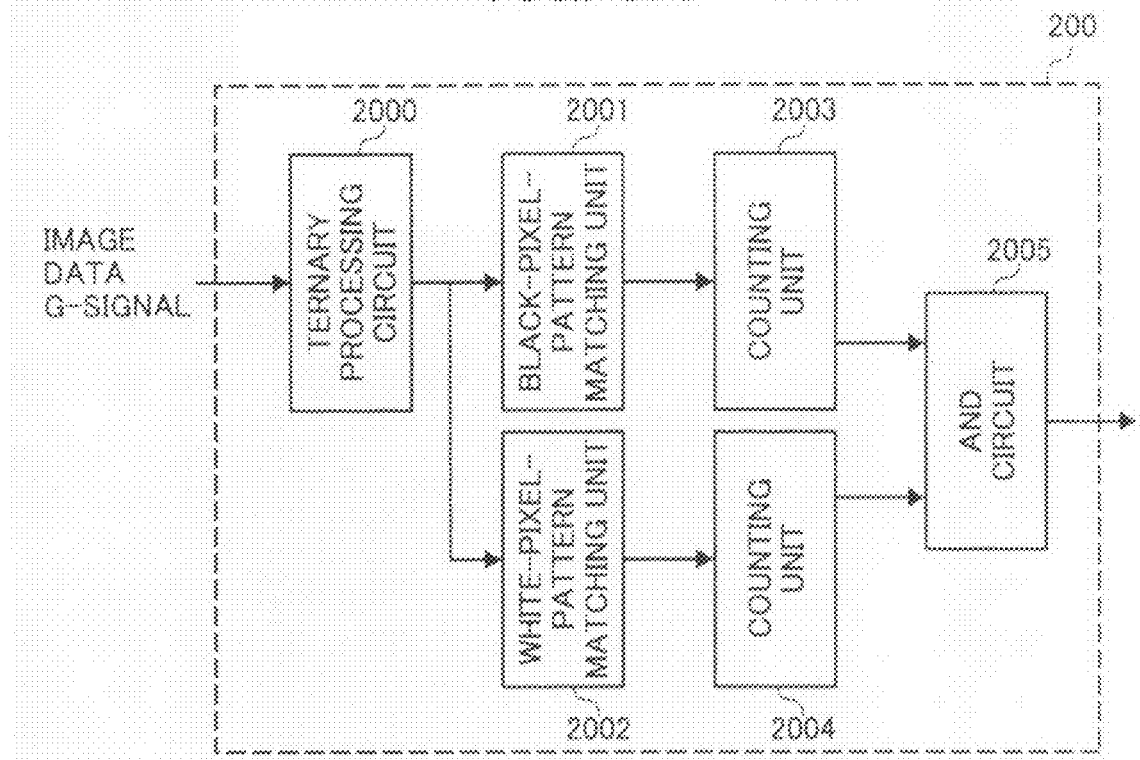
FIGS. 3A to 3C are views illustrating determination for an edge.
Figure 3B:
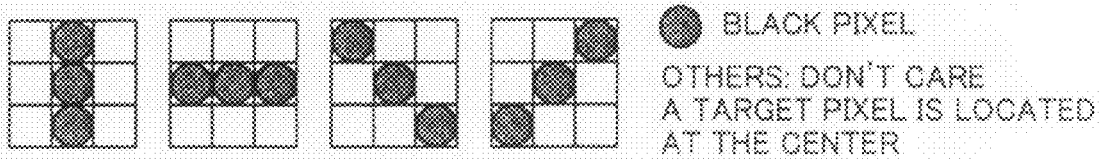
Figure 3C:
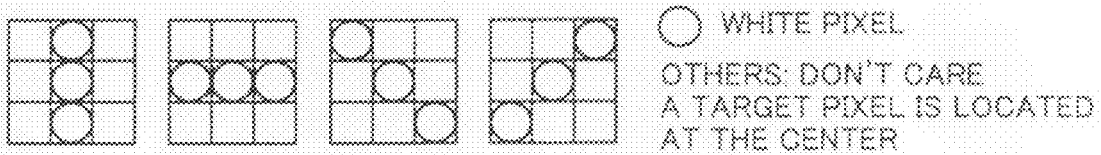

FIG. 2 illustrates a configuration of the attribute determining unit 20. FIG. 3A shows a configuration of an edge determining unit 200. A ternary processing circuit 2000 converts a G signal in an input image including 8 bits for each of the R, G, and G signals to a ternary value by using two threshold values of th1 and th2 (th1<th2). "0" is a value of darkest side while 255 is a value of the brightest side. When $0 \leq G \leq th1$, the target pixel is determined as a black pixel. When $th1<G<th2$, the target pixel is determined as an intermediate pixel. When $th2 \leq G \leq 255$, the target pixel is determined as a white pixel. When a black pixel pattern of a 3×3 matrix is equal to any of the patterns in FIG. 3B, a black-pixel-pattern matching unit 2001 determines that the target pixel as a continuous black pixel. Similarly, when a white pixel pattern of a 3×3 matrix is equal to any of the patterns in FIG. 3C, a white-pixel-pattern matching unit 2002 determines that the target pixel as a continuous white pixel. Counting units 2003 and 2004 count the number of the continuous black pixels and continuous white pixels within 3×3 pixels where each target pixel is located at the center thereof, and outputs "1" when the counted value is equal or more than a specific value (for example, 2). When an AND circuit 2005 receives "1" from both of the counting units, the attribute is determined as an edge section. This determination is performed based on the characteristics that the continuous white pixels and continuous black pixels should exist more than a certain level of density in an edge portion of a character.

Figure 4A:
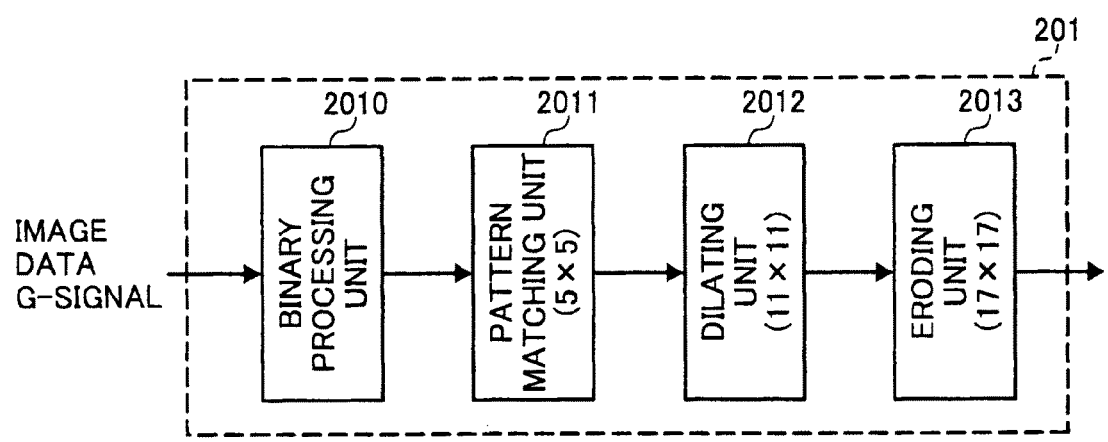
FIGS. 4A and 4B are views illustrating determination for a white background.
Figure 4B:
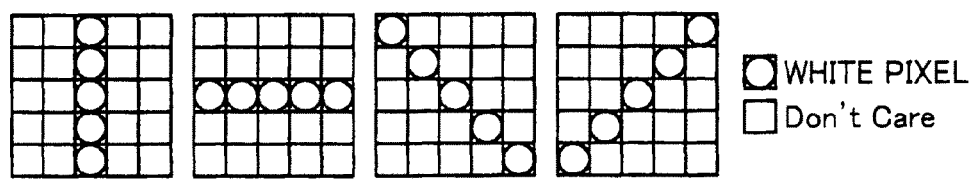

FIG. 4A illustrates a configuration of a white-background determining unit 201. A binary processing unit 2010 determines whether a G signal is included in any of two categories of a black pixel and a white pixel. A pattern matching 2011 is performed for a white pixel determined in the step above to reverse the result of the determination that a target pixel is a white pixel when the pixel is isolated from other white pixels. Specifically, pattern matching is performed by using patterns of FIG. 4B where white pixels are aligned in any of the four (vertical, horizontal, or, right or left diagonal) directions. When the pattern matches a series of white pixels in any of the four directions above, the pixel is determined as a white pixel. Otherwise, it is determined as a black pixel. Next, a dilating unit 2012 checks a target pixel and its neighboring 11×11 pixels. When even one white pixel is found, dilating processing is performed to reverse the target pixel to a white pixel as a dilating process. Then, an eroding unit 2013 checks a target pixel and its neighboring 17×17 pixels. When even one black pixel is found, eroding processing is performed to reverse the target pixel a black pixel as an eroding process. As a result of the eroding processing, an area of white pixels is finally determined as a white background area.

Figure 5A:
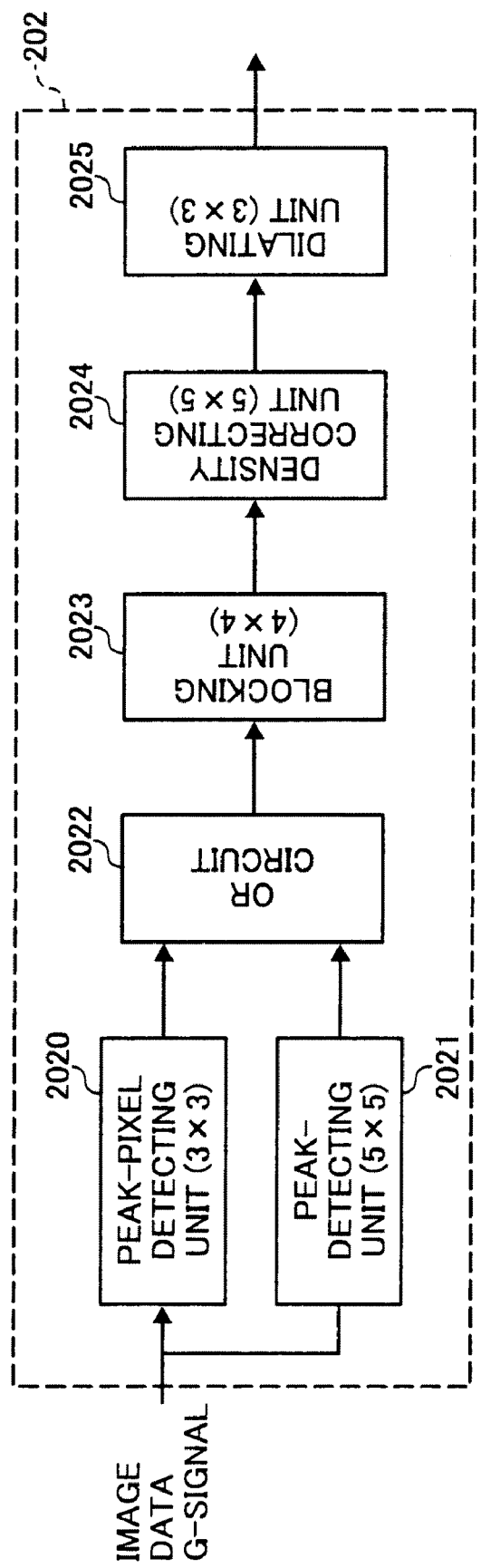
FIGS. 5A to 5C are views illustrating determination for a halftone area.

FIG. 5A shows a configuration of a halftone-dot determining unit 202. A halftone dot is determined by a method for peak pixel detection. The peak pixel detection is performed by determining whether a target pixel is at an inflection point of a peak or at a trough in consideration of the changes of density among a target pixel and its neighboring pixels. In a block consisting of M×M pixels, when a density level of a central pixel is higher or lower than that of any other pixels, the central pixel is checked to determine whether the pixel is at an inflection point using Expression (1) or (2). A peak-pixel detecting unit (3×3) 2020 detects a peak pixel according to the Equation (1). A peak detecting unit (5×5) 2021 detects a peak pixel according to Expression (2).

Figure 5B:
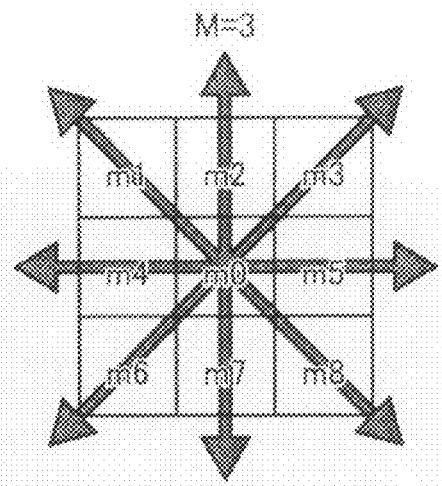

When M=3, (FIG. 5B)

$$|2m0-m1-m8| \geq \Delta TH$$

$$|2m0-m2-m7| \geq \Delta TH$$

$$|2m0-m3-m6| \geq \Delta TH, \text{ and}$$

$$|2m0-m4-m5| \geq \Delta TH \quad (1)$$

Figure 5C:
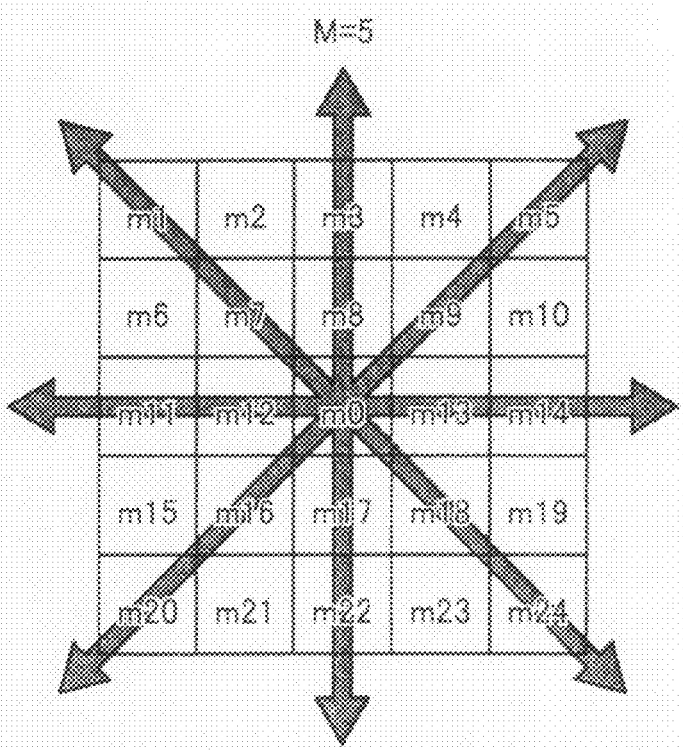

When M=5, (FIG. 5C)

$$|2m0-m3-m22| \geq \Delta TH$$

$$|2m0-m8-m17| \geq \Delta TH$$

$$|2m0-m1-m24| \geq \Delta TH, \text{ and}$$

$$|2m0-m7-m18| \geq \Delta TH \quad (2)$$

Namely, when an absolute value of the density difference between an average level value of two pixels symmetric about a center pixel and density of the center pixel is larger than a threshold value, $\Delta TH$, the center pixel is detected as a peak. Peak pixel detection can be carried out for each of RGB signal, but to simplify, peak detection can be done only for a G signal. Based on the information of peak pixels, determination is made as to whether the area is a halftone dot area. An OR circuit 2022 determines that a target pixel is a peak pixel when at least one of two peak-pixel detecting units 2020 and 2021 detects a peak pixel. When each block consisting of 4×4 pixels includes at least one peak pixel, a blocking unit 2023 determines that the block is an active block. When a counted value of the number of active block within 5×5 blocks having a target block at its center is equal to or more than a predetermined value, the target block is determined as a halftone block. Finally, a dilating unit 2025 performs a dilating process on the 3×3 block to set the target block to a halftone area when at least one halftone block exist therein.

Figure 6:
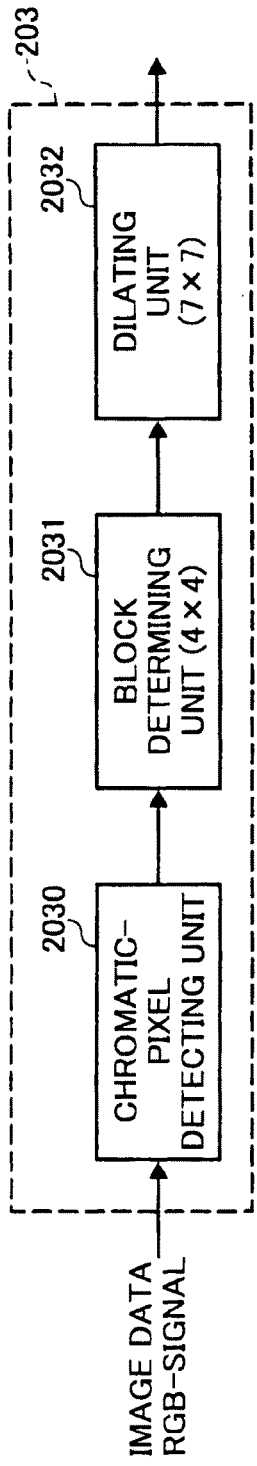
FIG. 6 is a view illustrating a color determining unit.

FIG. 6 shows a configuration of a color determining unit 203. A chromatic-pixel detecting unit 2030 detect a pixel where Max(|R−G|, |G−B|, |B−R|)>th3 is true as a chromatic pixel. When each block consisting of 4×4 pixels includes at least one chromatic pixel, a block determining unit 2031 determines that the block is an active block. A dilating unit 2032 performs a dilating process on 7×7 block and, when a target block includes at least one active block, determines that the target block is a chromatic area. This process is one example of the color determining method and enables very accurate determination by adding a process like the counting process as in the halftone dot determination to eliminate a wrong determination.

Figure 7:
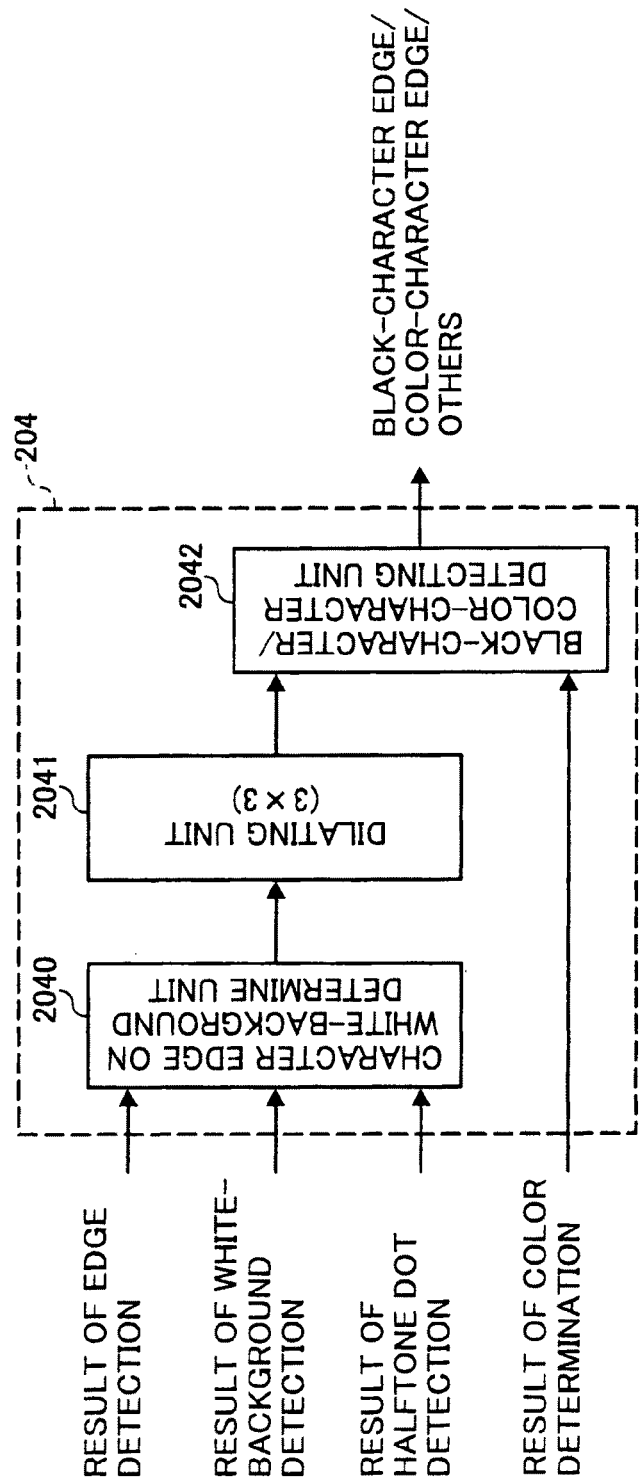
FIG. 7 is a view illustrating a configuration of a character-inside-area detecting unit.

FIG. 7 shows a configuration of a character-edge detecting unit 204. Based on results from the edge determining unit 200, the white-background determining unit 201, and the halftone-dot determining unit 202, a character edge on white-background determining unit 2040 determines a character edge candidate pixel. When a pixel is determined as an edge, white background and a non-halftone dot, the pixel is determined as a character edge candidate pixel. The edge determining unit 200 detects 1 dot for the inner edge and 1 dot for the outer edge as a character edge candidate pixel respectively. Since the two dots for the inner and outer edges are not enough for processing by a filter 13, a dilating unit (3×3) 2041 performs a dilating process, and a "character edge" is obtained as a result of the processes. The dilating unit 2041 refers to a character edge candidate pixel in 3×3 pixels with a target pixel at the center thereof, and, when even one character edge candidate pixel exists, the dilating unit 2041 determines that the target pixel is a character edge. A dilation amount in this case is 3×3, but, for example, 5×5 is desirable when a color shift characteristic and necessary dilation amount for filtering process is taken into consideration. A black-character/color-character detecting unit 2042 determines, when results of determination by the color determining unit 203 are character edge and a chromatic color, that the edge is "color-character edge", and, when results are character edge and achromatic color, that the edge is "black-character edge".

FIG. 8A shows a configuration of a character-inside-area detecting unit 205. Based on an identifying signal for a black-character edge, a character-inside-pixel-candidate detecting unit 2050 detects the black character inside area (further inside from the black-character edge area) as a character inside pixel candidate area. Furthermore, a RGB minimum value selecting unit 2051 select RGB minimum values from the RGB signals. A density determining unit 2052 categorizes the RGB minimum values into two categories using a predetermined threshold value to detect a pixel area whose density is more than predetermined density. An AND operating unit 2053 detects an area whose density is more than a predetermined value and which is a character inside pixel candidate area as a black character inside area. The reason why a limit of "more than predetermined density" is set is to avoid a wrong determination that a character edge and a white background section surrounded by character edge areas is a character inside area when the script is, for example, a grayish paper script like a newspaper. Predetermined density is set in advance in order to avoid the erroneous determination as described above in a script which has a low white level like a newspaper.

Figure 8B:
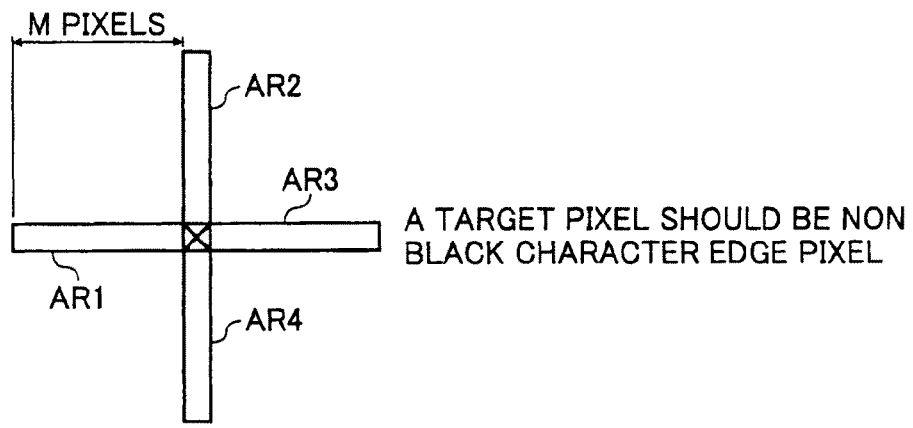

FIG. 8B is a view illustrating the character-inside-pixel-candidate detecting unit 2050. The unit refers to M pixels (for example M=27) in the vertical and horizontal directions. Left, upper, right, and lower areas against a target pixel are called AR1 through AR4 respectively. To determine whether the target pixel is an area that is surrounded by black-character edge areas, output signals of the character-edge detecting unit 204 of pixels in, for example, AR1 and AR3 areas are examined. When there are one or more black-character edge pixels in both AR1 and AR3 areas, the target pixel is determined as an area surrounded by black-character edge areas. Similarly, output signals of the character-edge detecting unit 204 of pixels in, for example, AR2 and AR4 areas are examined. When there are one or more black-character edge pixels in both AR2 and AR4 areas, the target pixel is determined as an area surrounded by black-character edge areas. When there are black-character edge areas in areas in three or all of the directions out of four directions of AR1 through AR4, the target pixel can be determined that the pixel is in an area surrounded by black-character edge areas. When a target pixel is a non-black-character edge area and is surrounded by black edge areas, the target pixel is determined as a character inside pixel candidate area. By increasing or decreasing the value of M defining a reference pixel range, it is possible to control the maximum size of a bold character to be applied by this character inside pixel candidate detection.

Figure 9:
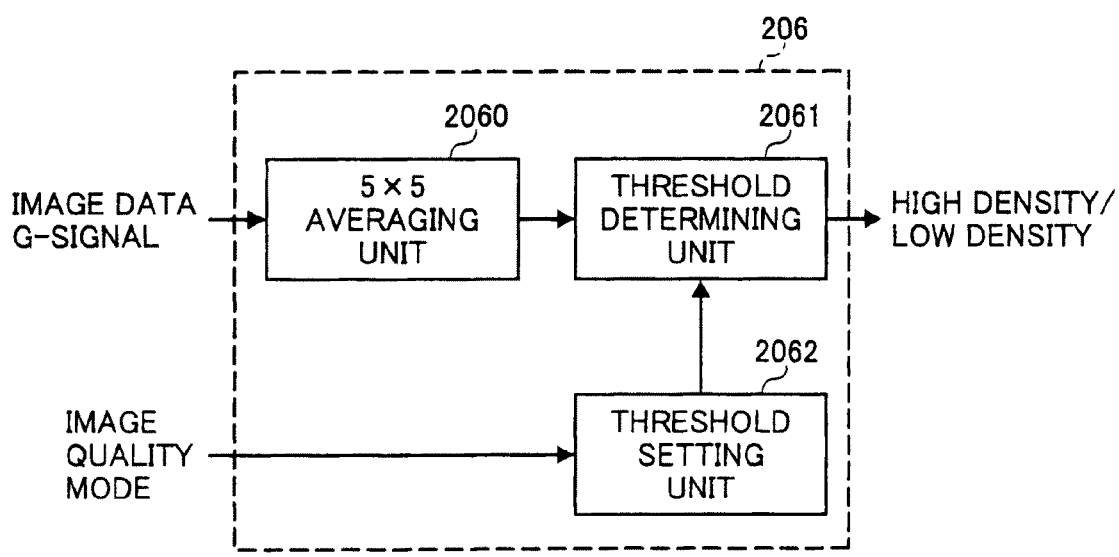
FIG. 9 is a view illustrating a density-information detecting unit.
Figure 19:
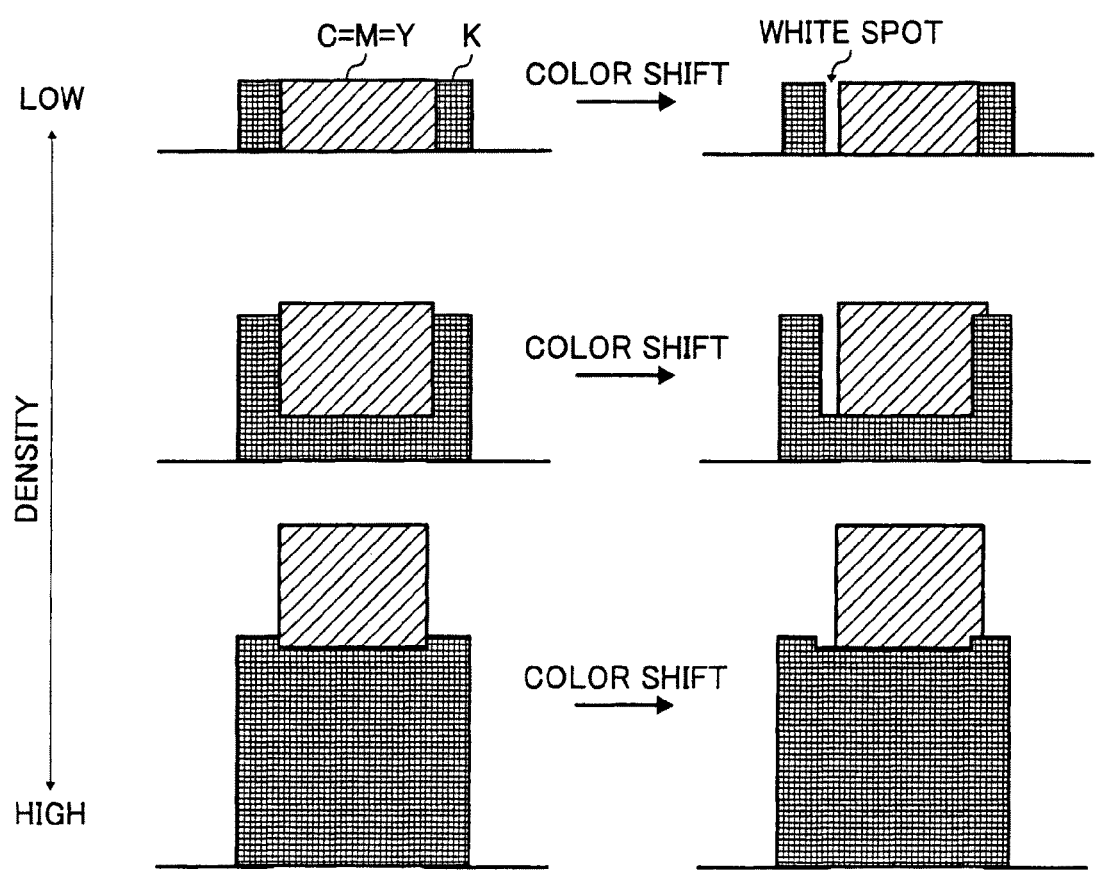
FIG. 19 is a view illustrating another prior art-based example.

FIG. 9 shows a configuration of a density-information detecting unit 206. When density information is detected, determination by checking a target pixel alone will have the problem such as that, when density of a character is close to a threshold value, a noise generated upon inputting to a scanner will influence the determination results so unsteadily that switching between processing for a high-density area and processing for a low density is performed very frequently. Therefore, neighboring pixels are added to be referred to in order to make it harder to cause such switching. Neighboring 5×5 pixels including a target pixel are examined. A 5×5 averaging unit 2060 calculates the average value of the pixels, and a threshold determining unit 2061 categorizes the average value using a threshold value. The threshold determining unit 2061 categorizes the pixel as a pixel in a high-density area or a pixel in low-density area based on a threshold value set by a threshold setting unit 2062. When the value is less than the threshold value, the area is determined as a high-density area, and when the value is equal to or more than the threshold value, the area is determined as a low-density area. The threshold value is set so that the density in which differences of color and brightness between character edge and character inside areas is noticeable after the conventional ink processing is applied is determined as a low-density area. This "low density", however, typically includes low and medium density. In FIG. 19 illustrating the conventional inking process, a low density bold character and a medium density bold character in top and middle figures is determined as "a low-density area", and only a high density bold character, third one from the top, is determined as "a high-density area".

The threshold setting unit 2062 can change the setting of a threshold value according to an image mode selected by a user. A user set a toner save mode, the threshold value is then set to the minimum value 0. By setting 0, the result is always determined as a low-density area, which practically disables the function to switch a process according to the density of a character inside area. The toner save mode is a mode in which a consumption rate of toner is saved by lowering printing density upon printing when only contents to be printed is needed to be checked in such a case as a test printing. In this mode where printing density is lowered in output, it doesn't make sense to reproduce the contents faithfully to the brightness of high density black characters on a scrip, and the toner consumption can be saved when a high density black character inside is reproduced by K color alone instead of K+CMY. Therefore, in a toner save mode, an equivalent or substantially equivalent image processing for black-character edge is also applied to even a high density black character inside area.

An attribute-signal generating unit 207 refers to the results of determinations by the halftone-dot determining unit 202, the character-edge detecting unit 204, the character-inside-area detecting unit 205, and the density-information detecting unit 206, and determines a target pixel belongs to any of the following: (1) a black-character edge, (2) a low density black character inside area, (3) a high density black character inside area, (4) a color-character edge, (5) a halftone dot, or (6) other area. When a result of the character edge detection is that the target area is an edge of a black or color character, it is determined that the target is an edge of a black character (1), and when the result is that the target is an edge of a colored character, it is determined that the area is a colored character edge. In a case where the result is neither (1) nor (4), and when the result of character inside detection is a black character inside area and the result of the density information detection is a low or high-density area, (2) or (3) is provided as a result respectively. In a case where the result is none of (1) through (4), and at the same time when the result of halftone dot determination is a halftone dot, (5) is provided as a result. Otherwise, (6) is provided as a result of the determination.

Figure 10B:
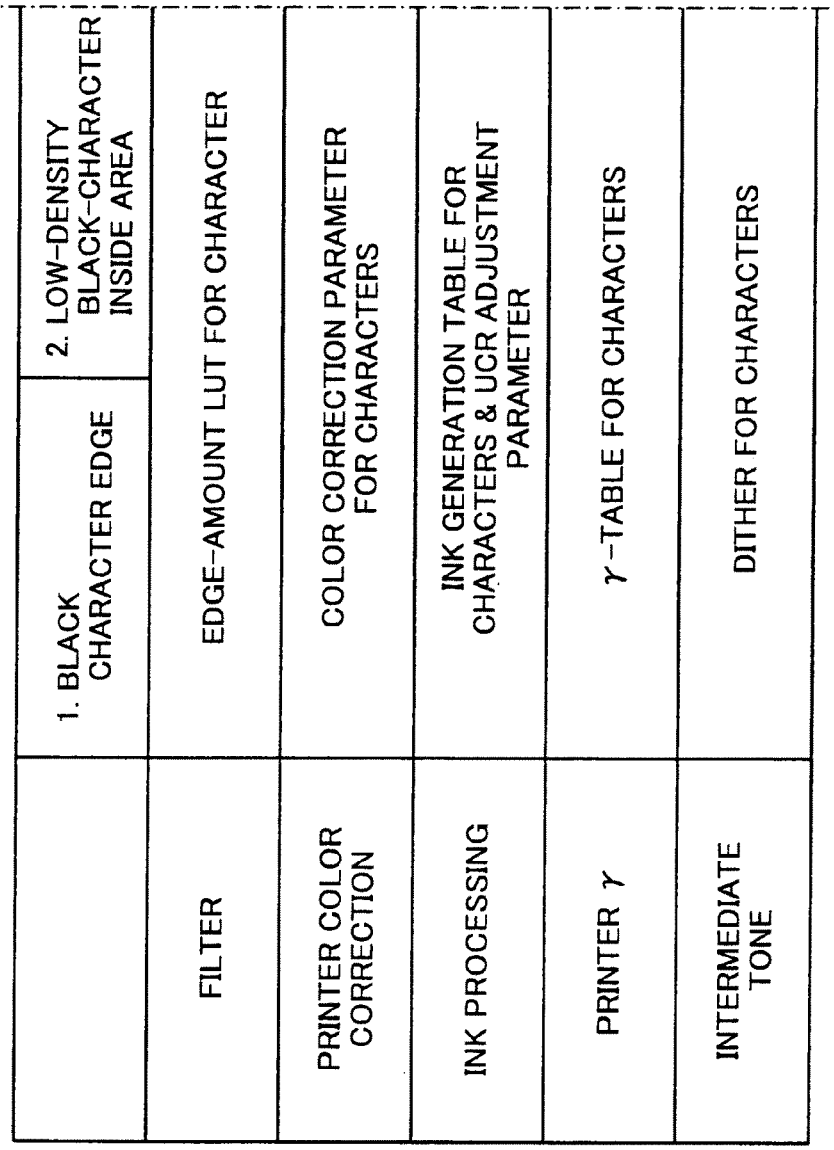

Next, image processing for improving image quality to various degrees is explained by referring to a result of determination by the attribute determining unit 20. In this example, a process using a result of attribute determination is carried out by a filter processing unit 13, a printer color correcting unit 15, an ink processing unit 16, a printer γ correcting unit 17, and a pseudo-halftone processing unit 18. FIG. 10 illustrates selection of image processing or image processing parameters, and the processing or the parameters are switched according to attributes of each image. FIG. 10A illustrates a case when a user selects an image quality mode in which emphasis is put on pictures. FIG. 10B illustrates a sample when a user selects an image quality mode in which emphasis is put on characters.

Figure 11:
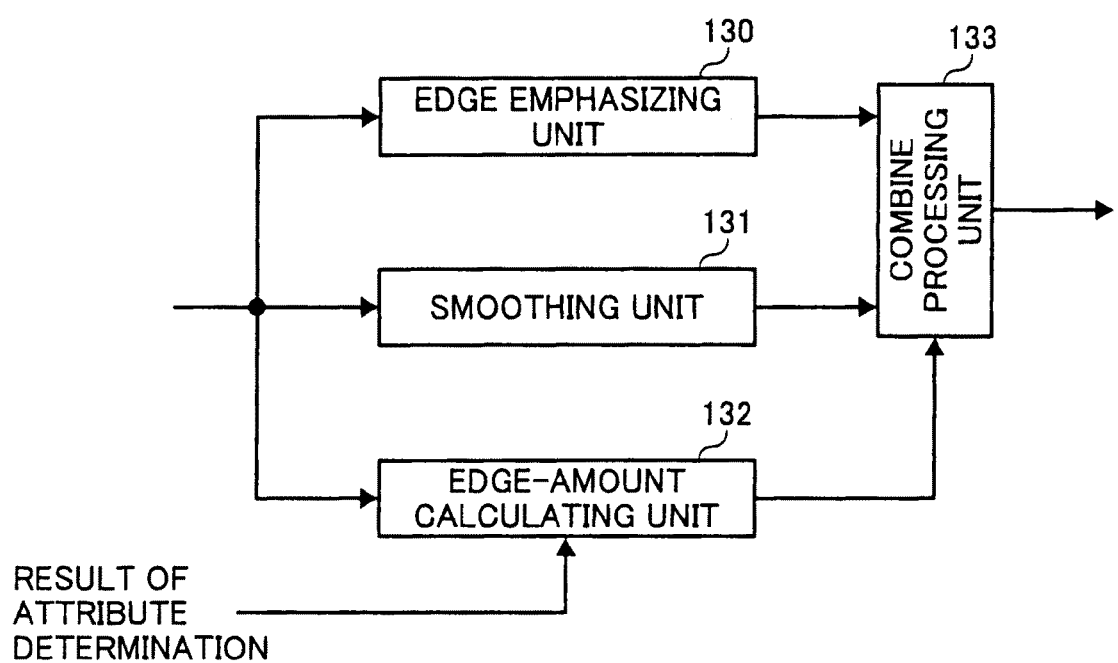
FIG. 11 is a view illustrating a configuration of a filter processing unit.

FIG. 11 illustrates a configuration of the filter processing unit 13. The filter processing unit 13 refers to a result of attribute determination, and performs filtering in order to clarify a profile of a character section as well as to suppress undulations on a halftone dot section for suppression of moiré. Two filtering processes are performed by an edge emphasizing unit 130 and a smoothing unit 131, and the both results are combined according to a ratio based on a result of edge amount detection by an edge-amount calculating unit 132. When the edge amount is larger or smaller, a combine processing unit 133 performs a combining process so that the ratio of output result of the edge emphasizing unit 130 or the smoothing unit 131 becomes larger respectively.

Figure 12A:
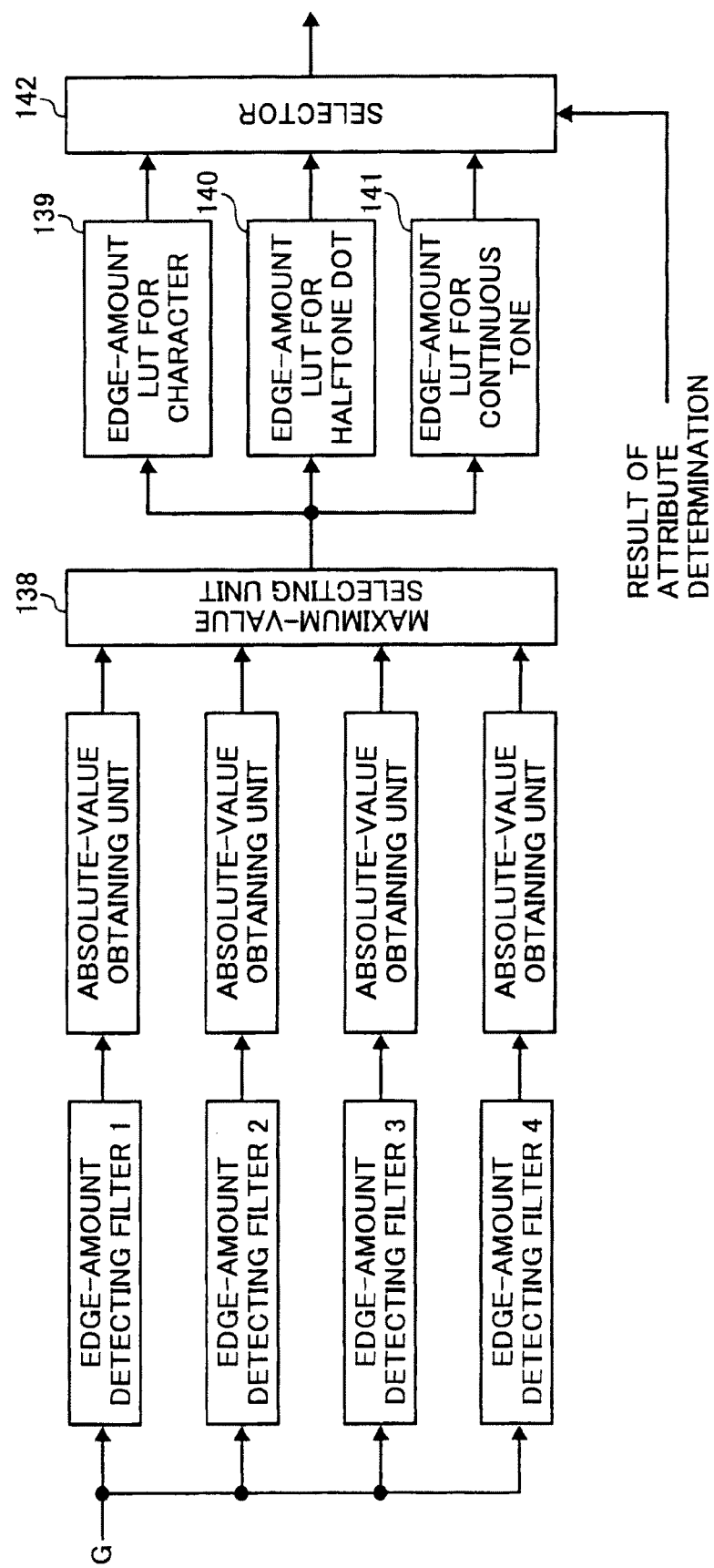
Figure 12B:
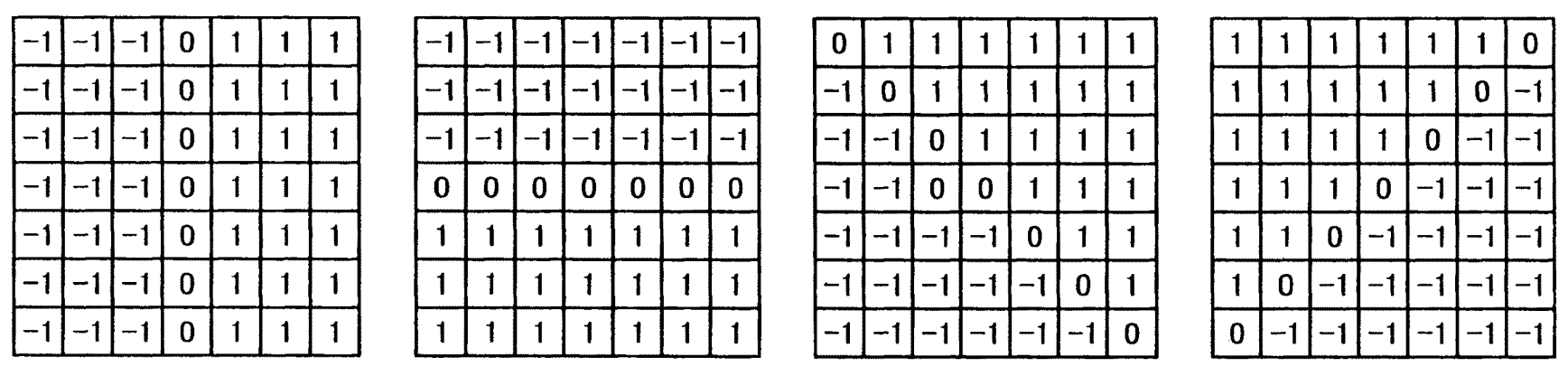

FIG. 12A shows a configuration of the edge-amount calculating unit 132. Each of the edge amount detecting filters 1 through 4 carries out masking calculation using each of four kinds of 7×7 filters shown in FIG. 12B respectively. The signal used for the edge amount detection is a G signal alone, but other signals such as brightness signal combined from RGB signal can be used. A maximum-value selecting unit 138 select one whose absolute value is larger than any one of three outputs, and carries out LUT conversion on the selected signal. As the LUTs, there are three kinds of LUTs provided. As LUTs, they are three LUTs, an edge-amount LUT for character 139, an edge-amount LUT for halftone dot 140, and an edge-amount LUT for continuous tone 141. A selector 142 finally selects an output signal from those LUTs as a result of the edge amount calculation unit 132 using the result of attribute determination. When the attribute of the signal is (1) through (4), (5), or (6), an edge-amount LUT for a character, an edge-amount LUT for a halftone dot, or an edge-amount LUT for continuous tone is selected respectively.

An image storing unit 14 stores image data after filtering is processed and a result of determination by the attribute determining unit 20 into a memory unit. The memorized image data can be transferred to an external device via an external interface 21, and it is possible to save data from the outside to the memory unit. Generally, in a copy flow, image data once stored and a result of attribute determination are read out and the data is transferred to an image processing section including the printer color correcting unit 15 and the like.

The printer color correcting unit 15 converts from R', G', B' signals independent from a device into C', M', and Y' signals which correspond to toner colors used in a printer. The conversion is expressed by $$C'=a0+a1xR'+a2xG'+a3xB'$$

$$M'=b0+b1xR'+b2xG'+b3xB'$$

$$C'=c0+c1xR'+c2xG'+c3xB'$$

wherein a0-a3, b0-b3, and c0-c3 are color correction parameters. Achromatic guarantee is provided so that, when R'=G'=B' is true, then C'=M'=Y' becomes true. Color correction parameters for characters and color correction parameters for pictures are prepared and switched according to a result of attribution determination. The color correction parameters for characters are used in a case of (1) a black-character edge or (2) a low density black character inside area, and the color correction parameters for pictures are used in a case of (3) through (6). The color correction parameter is set in order to minimize the color difference when used with ink processing parameters or the like and is switched along with parameters for an inking process.

The ink processing unit 16 generates a K signal in response to C', M', Y' data (ink generation), and subtracts an amount corresponding to K from C', M', and Y' (under Cover Removal: UCR) Both the ink processing and the UCR can be carried out by using an equation or an LUT. In this example, a case where ink processing is performed according to the LUT, and the UCR is performed by using an equation is explained.

Figure 13:
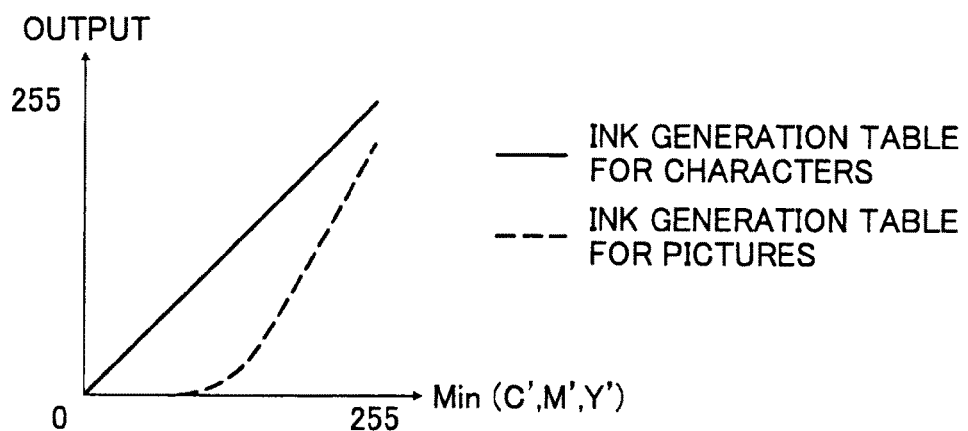
FIG. 13 is a graph illustrating ink generation LUT.

FIG. 13 illustrates LUT for ink processing. In the ink processing, minimum values Min(C', M', Y') of C', M', Y' (0 denotes white, and 255 denotes black) are calculated. And the values are input into the LUT to obtain an output result. An ink generation table for characters and an ink generation table for pictures are prepared and switched according to a result of attribution determination. The ink generation table for characters is used in a case of (1) black-character edge or (2) a low density black character inside area, and the ink generation table for pictures is used in a case of any of (3) through (6). The ink generation table for characters replaces all Min(C', M', Y') by a K signal. The ink generation table for pictures does not generate K in the highlighted state, and gradually generates K from the middle level. UCR is carried out according to the following equations.

$$C=C'-\alpha x K$$

$$M=M'-\alpha x K$$

$$Y=Y'-\alpha x K$$

where α is a UCR adjustment parameter. The UCR parameter is switched in response to ink generation. In an area where the ink generation table for characters is applied, α is set to 1, and in other cases, α is set, for example to 0.5.

Figure 14:
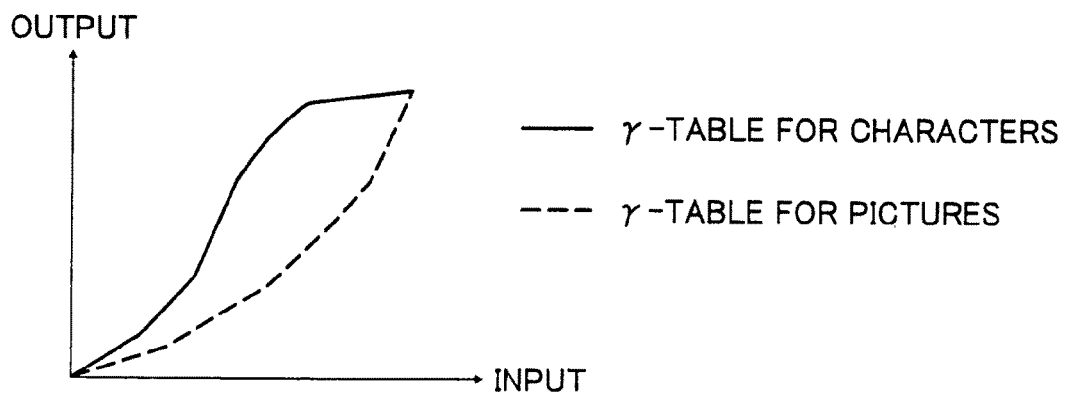
FIG. 14 is a graph illustrating a γ tables for characters and pictures.
Figure 15:
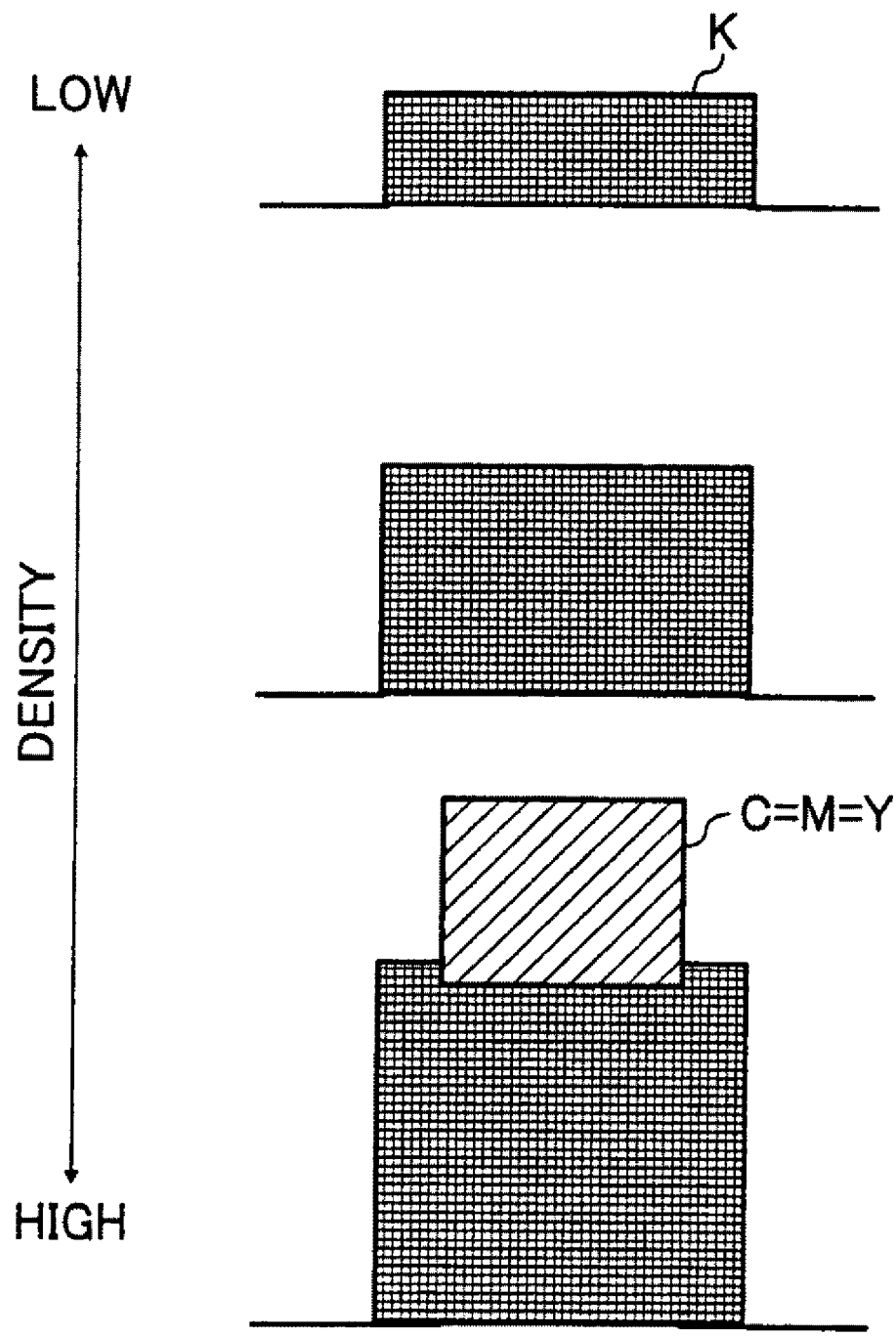
FIG. 15 is a view illustrating black character inside area processing according to the first embodiment.

The printer γ correcting unit 17 performs conversion processing using a density conversion table in response to density characteristics of a printer. The pseudo-halftone processing unit 18 performs a pseudo-halftone process such as dither and random dither. For example, for a pseudo-halftone, the dither process is carried out. The number of dither lines is switched in response to a result of attribute determination. When output resolution of a printer is 60 dpi, the number of dither lines for characters and pictures are set to 300 lines and 200 lines respectively. Also the he printer γ correction table is switched in correspondence to the processing above, and γ tables for both characters and pictures are provided as shown in FIG. 14. Furthermore the tables are switched according to a image quality mode selected by a mode, and in the image mode in which a weight is put on a picture, the printer γ conversion for a picture and medium tone processing are performed to a high density black character inside area, and in an image mode for a picture, the printer γ conversion for a character and the medium tone processing are performed to a high density black character inside area to suppress a gap between an edge of the high density character edge and an inside area of the character.

Figure 18:
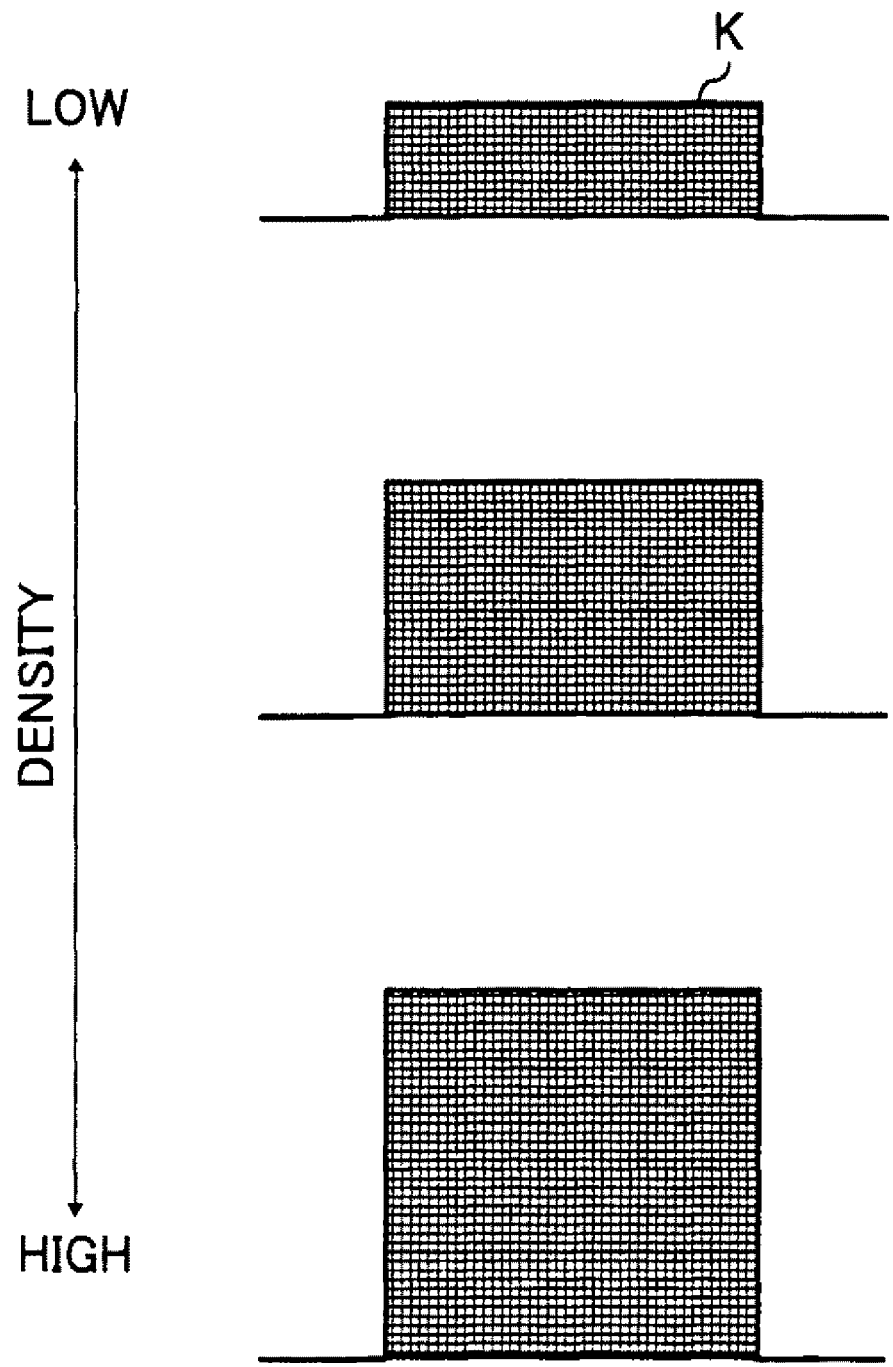
FIG. 18 is a view illustrating an prior art-based example.

As explained above, unlike the examples of conventional technology shown in FIG. 18 and FIG. 19, both high image quality reproduction without difference in colors and brightness between a character edge area and a character inside area and a white spot, and suppression of wrong separation of a picture section can be achieved simultaneously.

Figure 16A:
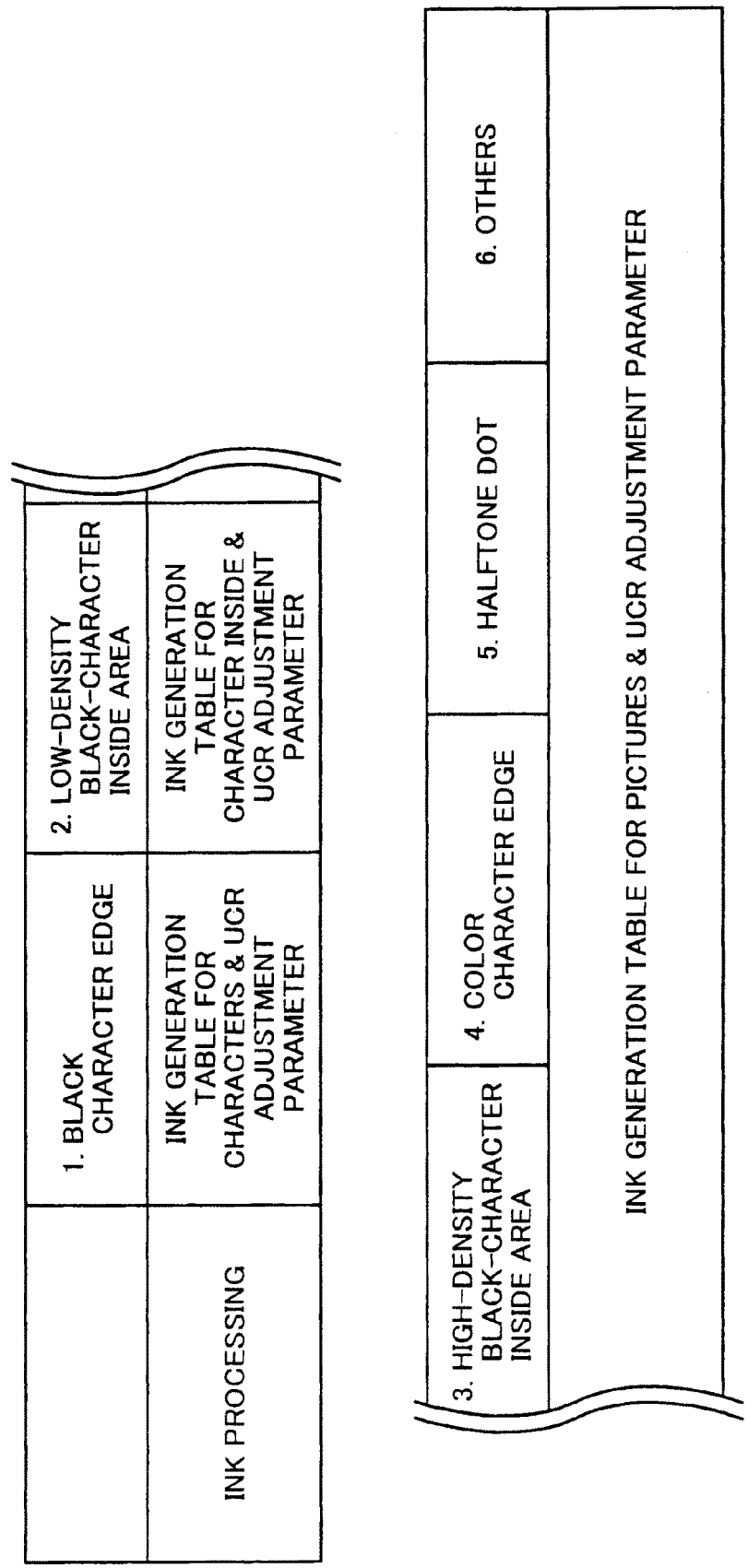
FIGS. 16A and 16B are a table and a graph for ink generation according to a second embodiment of the present invention.
Figure 16B:
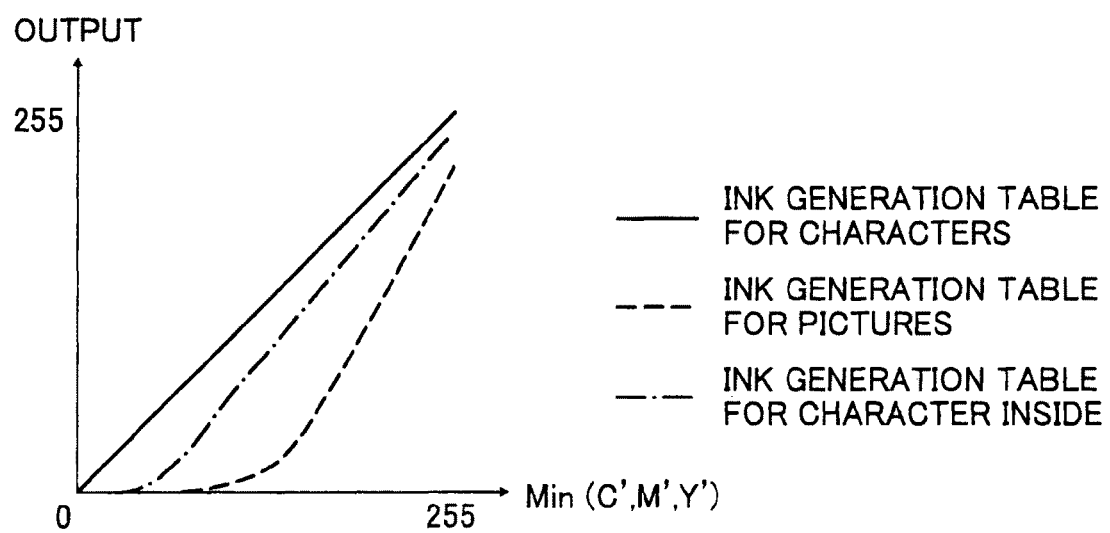

According to the first embodiment, exactly the same image processing is applied to both (1) a black-character edge and (2) a low density black character inside area. It is true that a trouble caused by a difference between a character edge and a character inside area can be resolved for low density black characters, but the different results of attribute determination inside a character may coexist when density is close to the density border between (2) a low density black character inside and (3) a high density black character inside area. When an image processing applied to (2) is largely different from that applied to (3), image quality of a character inside area at a specific density level may be degraded remarkably. Therefore, in this example, an image processing applied to (2) a low density black character inside area is not exactly the same as an image processing applied to (1) a black-character edge, but has a medium characteristics between the characteristics of image processes applied to (1) a black-character edge and (3) a high density black character. More specifically, in the ink processing, three ink generation tables for characters, pictures, and character inside are prepared, and the ink generation table for character inside has medium characteristics. As shown in FIG. 16A, each ink generation table is applied to each of the attribute areas (1), (2), and (3). The ink generation table for a character inside area is applied to (2) a low density black character inside area.

According to a second embodiment of the present invention, while degradation caused by switching processing for a bold character inside area at a specific density is suppressed, suppression of difference in colors and brightness between a character edge and a inside area of a low density bold character and a white spot, faithful reproduction of brightness of a high density far character, and suppression of wrong separation in picture section can be achieved simultaneously.

Figure 17A:
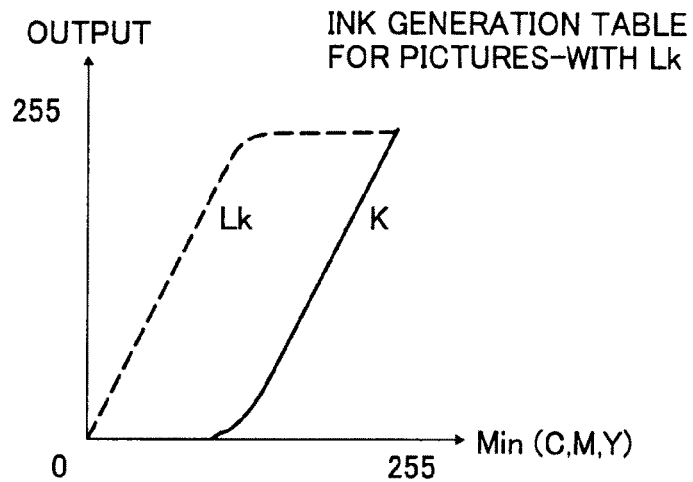
FIGS. 17A and 17B are views illustrating black character inside area processing according to the second embodiment.
Figure 17B:
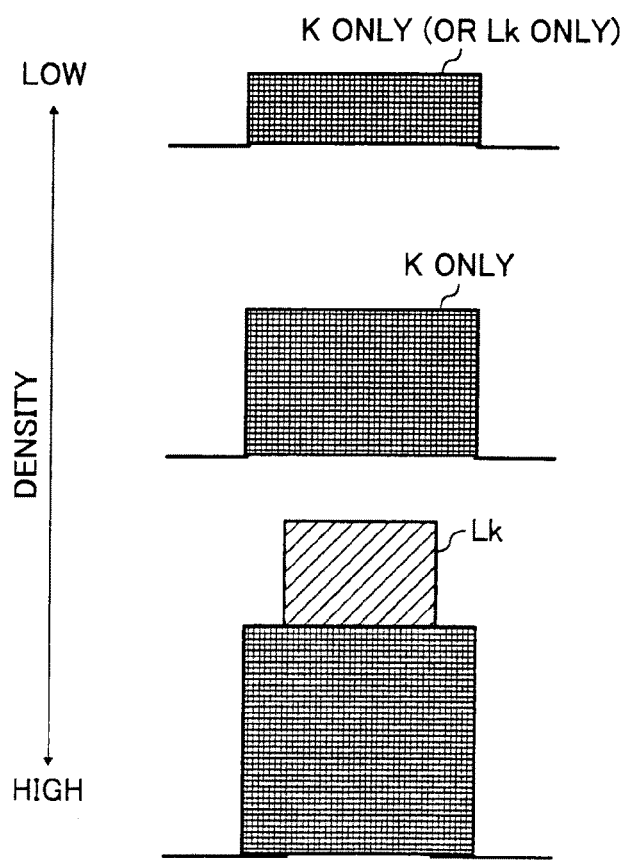

The present invention can also be applied to a device that outputs a reproduced image using five colors including Lk (light black) which is a light toner of K in addition to C, M, Y, and K. When a reproduced image is created using CMYK+Lk, ink processing aggressively using Lk for highlighting as shown in FIG. 17A to improve graininess of the highlight and gray stability is performed to a picture section, and ink processing accompanying K is applied from the medium range and on. On the other hand, as for a black-character edge, since degradation due to color shift between Lk and L upon outputting may occur, it is not desirable to use both Lk and K. It is desirable to use K only or to use Lk only for highlighting and to use only K for the middle range and on. In any case, in a high density black-character edge, ink processing is applied using K only, when an ink processing equivalent to that for an edge section is applied to black character inside, brightness of the script may not be reproduced faithfully and the density may becomes insufficient. To solve the problem, the ink generation table for pictures is replaced by the ink generation table for pictures with Lk in FIG. 17A. As for a black character inside area, as shown in FIG. 17B, by adding Lk toner to K to reproduce by K+Lk, reproduction mostly faithful to the brightness like reproduction with K+CMK is achieved.

According to a third embodiment of the present invention, in a device that reproduces images using Lk toner, since ink processing for a character inside area can be switched, only K or only Lk is used for reproducing inside of a low density black character, and K+Lk is used for reproducing inside of a high density black character, high image quality of reproduction in a low density bold character without any problem such as a white spot in character edge and character inside, reproduction faithful to brightness in a high density bold character, and suppression of wrong separation in picture section can be achieved concurrently.

In addition, the present invention can also be implemented when a recording media storing a program of a software that makes it possible to execute processing procedure or functions according to the embodiments above is provided in the system or the device, and a computer (CPU or MPU) of the system or device reads and executes program code stored in the recording media. In this case, the program code itself can be the processing procedure and functions in the embodiments described above. As a recording media to provide the program code, for example, a flexible disk, a hard disk, an optical disk, a magnetic optical device, a magnet tape, a nonvolatile memory card, and ROM can be used. By executing the program code read out by a computer, the procedure can be implemented and OS (Operating System) and the like working on the computer can execute any or all of actual processes according to instructions based on the program code, and, by the processing, the functions according to the embodiments described above can be implemented. In addition, the program code read out from the recording media is written into a memory mounted on a function expansion board inserted into a computer or on a function expansion board connected to a computer, and then a CPU or the like mounted on the function expansion board or unit executes any or all actual processes to implement the functions in the embodiments described above. Implementations of the functions are within a scope of the present invention.

As described above, according to one embodiment of the present invention, since a different image processing or different image processing parameters are applied to a character inside area with high density and character inside area with low density respectively according to density information obtained from each of the areas, proper processing can be applied to each character inside area having different density respectively, and an image faithful to the brightness in the script can be reproduced without remarkable differences in colors and brightness between a character edge area and a character inside area, nor with a white portion therein.

Furthermore, according to another embodiment of the present invention, since a different image processing or different image processing parameters are applied to a character inside area with high density and character inside area with low density respectively, it is possible to prevent an edge section of a bold character having high density from being wrongly colored, to faithfully reproduce the brightness of a character inside area, and also to suppress wrong separation of a picture area.

Moreover, according to still another embodiment of the present invention, an equivalent image processing or image processing parameters are applied to a character edge area and a character inside area with low density, a character image with high quality can be reproduced because of no difference in colors and brightness between the edge area and the character inside area and also because of no white spot in a bold character with low density.

Furthermore, according to still another embodiment of the present invention, since a different image processing or different image processing parameters are applied to each of a character edge area, a character inside area with low density, and a character inside area with high density, and furthermore since an image processing or image processing parameter for an image having medium characteristics are applied to a character inside area with low density, it is possible to minimize the degradation caused by switching in image processing performed during processing of a bold character with specific density, and to reproduce a high quality character image with less differences in colors and brightness between the edge area and the character inside area and also without a white spot in a bold character with low density.

Moreover, according to still another embodiment of the present invention, when a specific mode represented by the toner save mode is selected according to specification by a user, it is possible to substantially disable switching of an image processing or image processing parameters according to density information for inside of each character, so that a proper image can be reproduced in each processing mode.

Furthermore, according to still another embodiment of the present invention, since, with regard to at least one of the inking process, $\gamma$ conversion, and a pseudo medium tone image process, proper image processing or proper image processing parameters are selected according to density information for a character inside area, it is possible to effectively select a process for an image of a character inside area according to the density information and to reproduce a character image with high quality.

Moreover, according to still another embodiment of the present invention, since an inking process is selected according to density information for a character inside area also in a device that reproduces an image using two black color materials having different densities respectively, it is possible to concurrently achieve high quality image reproduction without any trouble such as a white spot in a bold character having low density, reproduction faithful to the brightness of a bold character having high density, and suppression of wrong separation in a picture section.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
   a character-edge detecting unit to detect a character edge area in an image;
   a character-inside-area detecting unit to detect a character inside area in the image;
   a density-information detecting unit to detect density information in the image; and
   an image processing unit to execute a predetermined image processing according to results of detecting the character edge area, the character inside area, and the density information, wherein
   the image processing unit applies different image processings or different image processing parameters to the character inside area based on the density information.

2. The image processing device according to claim 1, wherein
the density-information detecting unit detects a high-density area or a low-density area based on a predetermined threshold, and
the image processing unit applies different image processings or different image processing parameters to the character inside area based on whether the character inside area is the high-density area or the low-density area.

3. The image processing device according to claim 2, wherein when the character inside area is the high-density area, the image processing unit applies image processing or image processing parameters different from those applied to the character edge area to the character inside area.

4. The image processing device according to claim 2, wherein when the character inside area is the low-density area, the image processing unit applies image processing or image processing parameters equivalent to those applied to the character edge area to the character inside area.

5. The image processing device according to claim 4, wherein when the character inside area is the low-density area, the image processing unit applies image processing or image processing parameters having medium characteristics between those for the character edge area and those for the character inside area of the high-density area.

6. The image processing device according to claim 1, further comprising a selecting unit to select an image quality mode based on a specification from a user, wherein
when a specific image quality mode is selected, a switching of the image processing or the image processing parameters in response to the density information of the character inside area is substantially invalidated.

7. The image processing device according to claim 6, wherein the specific image quality mode is a toner save mode in which a consumption of a color material is saved.

8. The image processing device according to claim 1, wherein the predetermined image processing includes at least one selected from a group consisting of an ink processing, a γ conversion, and a pseudo-halftone processing.

9. The image processing device according to claim 2, wherein
the predetermined image processing is an ink processing,
the image processing device further comprises an image reproducing unit to reproduce the image using two black color materials of different densities,
when the character inside area is the high-density area, the image processing unit executes an ink processing for reproducing the image using the two black color materials, and
when the character inside area is the low-density area, the image processing unit executes an ink processing for reproducing the image using either one of the two black color materials.

10. An image processing method using an image processing device having a character-edge detecting unit, a character-inside-area detecting unit, a density-information detecting unit, and an image processing unit, the image processing method comprising:
detecting, by the character-edge detecting unit of the image processing device, a character edge area in an image;
detecting, by the character-inside-area detecting unit of the image processing device, a character inside area in the image;
detecting, by the density-information detecting unit of the image processing device, density information in the image; and
executing, by the image processing unit, a predetermined image processing according to results of detecting the character edge area, the character inside area, and the density information, wherein
the executing the predetermined image processing includes applying different image processings or different image processing parameters to the character inside area based on the density information.

11. The image processing method according to claim 10, wherein
the detecting density information includes detecting a high-density area or a low-density area based on a predetermined threshold, and
the executing the predetermined image processing includes applying different image processings or different image processing parameters to the character inside area based on whether the character inside area is the high-density area or the low-density area.

12. The image processing method according to claim 11, wherein when the character inside area is the high-density area, the executing the predetermined image processing includes applying image processing or image processing parameters different from those applied to the character edge area to the character inside area.

13. The image processing method according to claim 11, wherein when the character inside area is the low-density area, the executing the predetermined image processing includes applying image processing or image processing parameters equivalent to those applied to the character edge area to the character inside are.

14. The image processing method according to claim 13, wherein when the character inside area is the low-density area, the executing the predetermined image processing includes applying image processing or image processing parameters having medium characteristics between those for the character edge area and those for the character inside area of the high-density area.

15. The image processing method according to claim 10, further comprising selecting an image quality mode based on a specification from a user; wherein
when a specific image quality mode is selected, a switching of the image processing or the image processing parameters in response to the density information of the character inside area is substantially invalidated.

16. The image processing method according to claim 15, wherein the specific image quality mode is a toner save mode in which a consumption of a color material is saved.

17. The image processing method according to claim 10, wherein the predetermined image processing includes at least one of an ink processing, a γ conversion, and a pseudo-halftone processing.

18. The image processing method according to claim 11, wherein
the predetermined image processing is an ink processing,
the image processing method further comprises reproducing the image using two black color materials of different densities,
when the character inside area is the high-density area, the executing the predetermined image processing includes executing an ink processing for reproducing the image using the two black color materials, and
when the character inside area is the low-density area, the executing the predetermined image processing includes executing an ink processing for reproducing the image using either one of the two black color materials.

19. A computer program product comprising a non-transitory computer-usable medium having computer-readable program codes embodied in the medium that when executed cause a computer to performs a method comprising:
  detecting a character edge area in an image;
  detecting a character inside area in the image;
  detecting density information in the image; and
  executing a predetermined image processing according to results of detecting the character edge area, the character inside area, and the density information, wherein the executing includes applying different image processings or different image processing parameters to the character inside area based on the density information.

* * * * *